(12) United States Patent
Eriksson et al.

(10) Patent No.: US 10,251,185 B2
(45) Date of Patent: Apr. 2, 2019

(54) ALLOCATING PARTIALLY OVERLAPPING RESOURCES TO COMMUNICATION DEVICES

(71) Applicant: Telefonaktiebolaget LM Ericsson (publ), Stockholm (SE)

(72) Inventors: Erik Eriksson, Linköping (SE); Martin Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/524,082

(22) PCT Filed: Nov. 4, 2014

(86) PCT No.: PCT/SE2014/051301
§ 371 (c)(1),
(2) Date: May 3, 2017

(87) PCT Pub. No.: WO2016/072887
PCT Pub. Date: May 12, 2016

(65) Prior Publication Data
US 2017/0318593 A1    Nov. 2, 2017

(51) Int. Cl.
*H04W 72/08*    (2009.01)
*H04W 72/04*    (2009.01)
*H04L 5/00*    (2006.01)

(52) U.S. Cl.
CPC ........... *H04W 72/085* (2013.01); *H04L 5/006* (2013.01); *H04W 72/08* (2013.01); *H04W 72/082* (2013.01); *H04W 72/044* (2013.01)

(58) Field of Classification Search
CPC .... H04W 72/085; H04W 72/082; H04L 5/006
See application file for complete search history.

(56) References Cited

U.S. PATENT DOCUMENTS

| 8,391,794 | B2* | 3/2013 | Sawai | H04W 52/16 455/464 |
| 2003/0142655 | A1* | 7/2003 | Higuchi | H04B 1/7107 370/342 |
| 2011/0195704 | A1 | 8/2011 | Choi et al. | |
| 2012/0294346 | A1* | 11/2012 | Kolze | H04L 27/2614 375/224 |
| 2014/0029562 | A1 | 1/2014 | Kishiyama | |

FOREIGN PATENT DOCUMENTS

| EP | 2506624 A1 | 10/2012 |
| WO | 2013122180 A1 | 8/2013 |

* cited by examiner

*Primary Examiner* — Mohammad S Anwar
(74) *Attorney, Agent, or Firm* — Patent Portfolio Builders, PLLC

(57) ABSTRACT

A method of assigning transmission resources by an access node includes allocating first transmission resources to a first device, and allocating second transmission resources to a second device, wherein the second transmission resources partially, but not completely, overlap the first transmission resources. An amount of overlap between the first transmission resources and the second transmission resources may be based on a target error rate for decoding transmissions received from the first device and the second device and/or a signal to interference plus noise ratio (SINR) of transmissions from the first device and the second device. Related access nodes are disclosed.

16 Claims, 10 Drawing Sheets

ALLOCATING PARTIALLY OVERLAPPING RESOURCES TO COMMUNICATION DEVICES

TECHNICAL FIELD

The present application relates to wireless communications systems, and more particularly, to allocation of radio resources to wireless communications devices.

BACKGROUND

Machine Type Communication, also referred to as Machine to Machine (M2M) communications, refers to wireless and wired communications between devices. MTC has a wide range of applications, including industrial automation, logistics, monitoring but also for control purposes.

MTC is widely used for industrial instrumentation applications in which a device, such as a sensor or meter, captures real-time data, such as temperature, inventory level, error reports, surveillance images, etc., and transmits the captured data to a data collection node. In addition to instrumentation, MTC is also being widely adopted for other applications, such as telemetry and automation.

Enabling reliable ultra-low delay machine-type communication (MTC), i.e., Critical-MTC, is an important goal of designers of next generation wireless communications systems.

There are a number of design trade-offs that may be considered in the development of critical MTC application support. These trade-offs include, for example, end-to-end latency, transmission reliability, system capacity and deployment. Moreover, designing a wireless network for critical MTC support requires consideration of various different use cases. Each use case may involve different types of communications, with different bandwidth, latency, and reliability requirements.

For example, in the area of industrial automation, the system may need to accommodate two different classes of messages, namely, messages with ultra-low latency sporadic data (e.g., alert message) and messages with best-effort data (e.g., real-time periodic data).

SUMMARY

It is a general objective to allocate transmission resources to network devices in a manner that meets bandwidth, latency, and/or reliability requirements for particular applications.

It is a particular objective to allocate non-orthogonal transmission resources to network devices in a manner that provide high bandwidth, low latency, and high reliability for machine type communication applications.

These and other objectives are met by embodiments as disclosed herein.

A first aspect provides a method of assigning transmission resources by an access node. The method includes allocating first transmission resources to a first device, and allocating second transmission resources to a second device, wherein the second transmission resources partially, but not completely, overlap the first transmission resources. An amount of overlap between the first transmission resources and the second transmission resources may be based on a target error rate for decoding transmissions received from the first device and the second device and/or a signal to interference plus noise ratio (SINR) of transmissions from the first device and the second device.

The method may further include calculating an actual error rate for decoding transmissions received from the first device and/or the second device, and adjusting a level of overlap between the first and second transmission resources in response to the actual error rate.

An amount of overlap between the first transmission resources and the second transmission resources may be based on access probabilities of the first device and the second device.

An amount of overlap between the first transmission resources and the second transmission resources may be based on a probability of successfully decoding transmissions by the first and second devices that utilize an overlapping portion of the first and second transmission resources.

A second aspect provides an access node interacting with first and second user equipment nodes. The access node includes a resource scheduler module that allocates first transmission resources to a first device and allocates second transmission resources to a second device, wherein the second transmission resources partially, but not completely, overlap the first transmission resources, and wherein an amount of overlap between the first transmission resources and the second transmission resources is based on a target error rate for decoding transmissions received from the first device and the second device and/or a signal to interference plus noise ratio (SINR) of transmissions from the first device and the second device.

The access node may further include a transceiver that receives first and second signals from the first and second devices that were transmitted using the overlapping first and second transmission resources, an interference reducing module that reduces interference in the first and second signals, and a decoding module that decodes the first and second signals.

The access node may further include a transceiver that receives first and second signals from the first and second devices that were transmitted using the overlapping first and second transmission resources, a decoding module that decodes the first signal, and an interference reducing module that reduces interference in the second signal based on the decoded first signal, wherein the decoding module decodes the second signal after reducing interference in the second signal.

A third aspect provides an access node that includes a processor circuit, a transceiver coupled to the processor, and a memory device coupled to the processor. The memory device includes a resource scheduler module that generates resource allocation commands that allocate first transmission resources to a first device and allocates second transmission resources to a second device, wherein the second transmission resources partially, but not completely, overlap the first transmission resources, and wherein an amount of overlap between the first transmission resources and the second transmission resources is based on a target error rate for decoding transmissions received from the first device and the second device and/or a signal to interference plus noise ratio (SINR) of transmissions from the first device and the second device. The processor circuit causes the transceiver to transmit the resource allocation commands to a plurality of remote devices.

A fourth aspect provides a method of assigning transmission resources by an access node that includes allocating first transmission resources to a first device, and allocating second transmission resources to a second device, wherein a portion of the second transmission resources overlap a portion of the first transmission resources, wherein an amount of overlap between the first transmission resources and the second transmission resources is based on a target error rate for decoding transmissions received from the first device and the second device and/or a signal to interference plus noise ratio (SINR) of transmissions from the first device and the second device.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
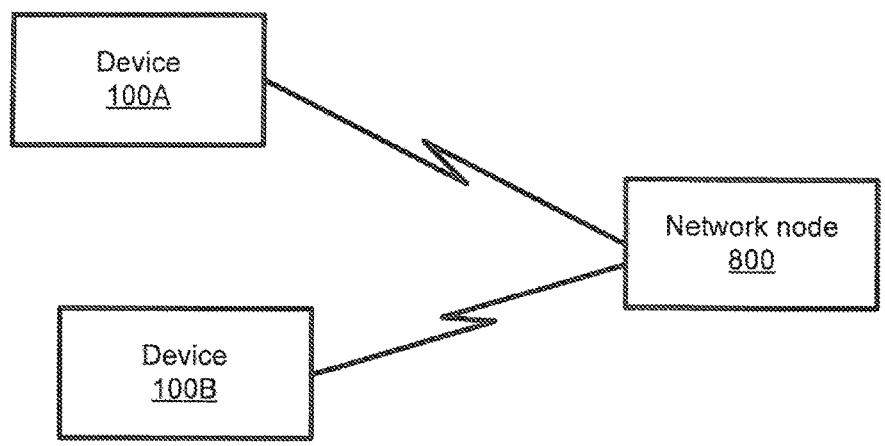
FIG. 1 is a schematic diagram illustrating a communication system in which two devices communicate with a central node.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements that, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Some embodiments provide radio resource management systems/methods that may accommodate multiple classes of messages. These systems/methods may have particular applicability in a machine type communications environment, but some embodiments are not limited to MTC. A "radio resource" or "transmission resource" may include a physical or logical resource that can be used to transmit information. A "radio resource" or "transmission resource" can include, for example, a frequency band in a frequency division multiplexing communication system, a time slot in a time division multiplexing communication system, a sub-carrier of a symbol in an orthogonal frequency division multiplexing (OFDM) communication system, a spreading code in a code division multiplexing communication system, an antenna beam, etc.

In particular, some embodiments grant non-orthogonal access to uplink communication channels for devices that are expected to transmit small amounts of data on a sporadic basis (e.g., alert messages), where the transmitted messages require short latency times. In this context, "non-orthogonal" means that multiple devices are granted partially overlapping radio resources.

The amount by which the resources overlap may be selected based on the probability of simultaneous access by the devices whose access resources overlap, the probability of decoding the message in the presence of interference between the devices, and the ability to cancel the interference at decoding.

Some embodiments utilize the fact that there may be a low probability of a large number of devices accessing a shared resource simultaneously, in comparison to the probability of a single device accessing the shared resource, to reduce channel resource consumption while maintaining a low error rate. Some embodiments may also utilize the difference in resources needed to provide very low error rate requirements.

Existing approaches to sharing the communication resources among multiple devices can be grouped in three classes:

Scheduling-based protocols. In a scheduling-based protocol, each transmitter accesses the network using a dedicated radio resource that is scheduled every transmission time interval (TTI) or several TTIs. LTE dynamic and semi-persistent scheduling are well-known examples of schedule-based access. The characteristics of scheduling-based access protocols are high reliability, long access delays, and efficient resource utilization.

Reservation-based protocols. In a reservation based access protocol, each transmitter accesses the network using a dedicated radio resource that is given to the device for a relatively long time interval. Non-contention based random access is a well-known example of a reservation-based access protocol. The characteristics reservation-based access protocols are high reliability, short access delays, and inefficient resource utilization.

Contention-based protocols. In a contention based access protocol, two or more transmitters may attempt to simultaneously access the same radio resource. Such protocols include contention based radio access (in UMTS and LTE communication systems), and listen-before-talk in IEEE 802.11 communication systems. The characteristics of contention-based protocols are low reliability, short access delays, and inefficient resource utilization, particularly when a large number of transmitters attempt to simultaneously access the network.

Even though the existing solutions are widely used in communication networks, they may not be fully suitable for some Critical-MTC applications that need to accommodate sporadic small data transmissions, such as alert and emergency messages, because of the fact that it is desired in a Critical-MTC application to provide high reliability, short access delays, and efficient resource utilization at the same time. Moreover, in an MTC application, it may be desirable to provide such a level of service to a large number of devices. For ensuring high reliability, a conventional contention-based access scheme may be unsuitable even at very low access probabilities due to the strict reliability requirements for certain types of messages.

Some embodiments grant access to radio resources that are partially, but not completely, overlapping. For example, FIG. 1 is a schematic diagram illustrating a communication system in which two devices 100A, 100B communicate with a network node 800A that grants overlapping radio resource access privileges to the devices 100A, 100B. The overlapping radio resources may, for example, include overlapping frequency bands in an FDM communication system, overlapping time slots in a TDM communication system, and/or quasi-orthogonal spreading codes in a CDM communication system.

Figure 2A:
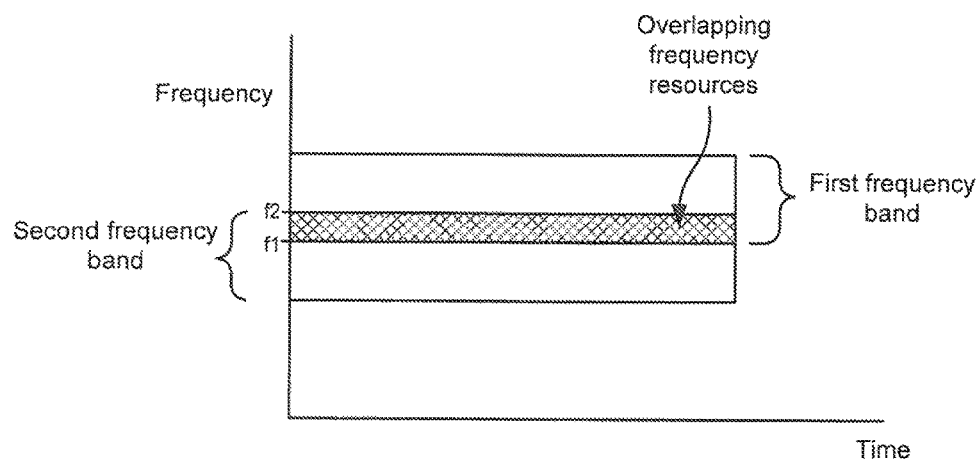
FIGS. 2A and 2B are graphs that illustrate assignment of overlapping resources in the frequency domain and time domain, respectively.

Overlapping frequency bands in an FDM communication system are illustrated in FIG. 2A. As shown therein, a first frequency band and a second frequency band are defined in the frequency domain. The first frequency band and the second frequency band overlap from a first frequency f1 to a second frequency f2. Thus, if a first device 100A to which the first frequency band is assigned and a second device 100B to which the second frequency band is assigned attempt to transmit signals simultaneously to the network node 800A, the signals may collide, and be subjected to co-channel interference in the frequency range from f1 to f2.

Figure 2B:
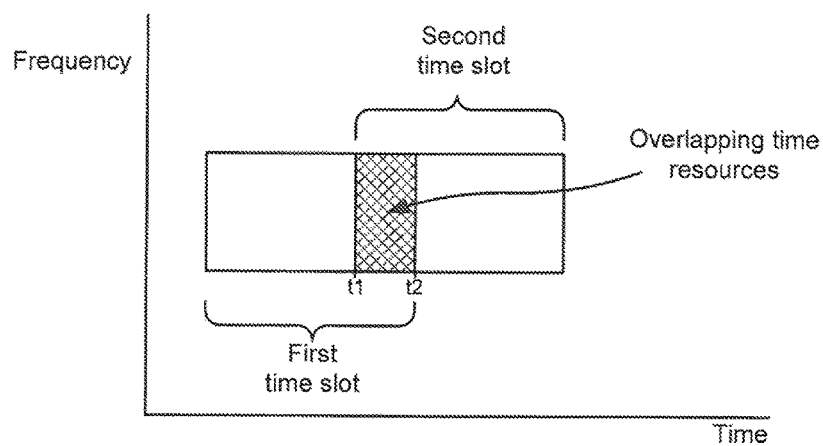

Overlapping time slots in a TDM communication system are illustrated in FIG. 2B. As shown therein, a first time slot and a second time slot are defined in the time domain. The first time slot and the second time slot overlap from a first time t1 to a second time t2. Thus, if a first device 100A to which the first time slot is assigned and a second device 100B to which the second time slot is assigned attempt to transmit signals to the network node 800A in the respective first and second time slots, the signals may collide and be subjected to co-channel interference during the time period from t1 to t2.

In a CDM communication system, communications may use the same time and frequency resources. When orthogonal spreading codes are used to modulate and recover the transmitted signals, undesired signals may appear as uncorrelated noise to a receiver, allowing the receiver to recover the desired signal. When quasi-orthogonal spreading codes are used, the undesired signals may appear as correlated, or colored, noise at the receiver, thereby reducing the signal to noise ratio at the receiver.

In some embodiments, a radio resource used by a device can be divided into a number of component parts. In some cases, each component part may experience similar interference from other devices served by the same network node. At the network node, the receiver may attempt to decode the signal transmitted using only one component part, or a subset of the component parts, with the assumption that there is no significant interference from users served by the same network node. This can be done on a component part that has not been assigned to any other user or using one or more component parts where the access probability of the assigned users is low. Multiple hypotheses on interference free resources can be tried for a user. These multiple hypothesis may be associated with different probabilities, such as known or estimated transmission probabilities for the different users and decoding success probabilities for the different interference cases.

In some embodiments, interference cancellation is used to decode the received signals. For example, in some embodiments, successive interference cancelation (SIC) may be used to decode signals from multiple terminals that were transmitted using overlapping radio resources. In SIC, a data transmission form one device may be decoded. The decoded signal can be removed from the overlapping components of signals received from other devices. The decoding probability of other users to which overlapping resources are assigned and hence may experience interference from the decoded signal, can be improved when the interference is removed using the SIC technique.

In some embodiments, a network node, which is responsible for assigning radio resources for sporadic messages for at least two users where the assigned resources are partially overlapping/non-orthogonal, may perform load control. The network node may take into account both the probability of a device triggering a sporadic message and the probability of decoding the message on the assigned resource with and without collisions, and for the case of collision the probability of decoding the colliding user and the probability of decoding after canceling the interference from the colliding user.

Referring again to FIG. 1, in a first example including first and second devices 100A, 100B, the events of triggering a sporadic message and using the assigned overlapping resource by the first and second devices 100A, 100B are denoted as Ma,1 and Ma,2, respectively. The successful decoding of the signal Ma,1 may be denoted as D(Ma,1)=1, while a failed decoding is denoted D(Ma,1)=0. The network node assigns resource sets R1 and R2 to devices 100A, 1008, respectively, where R1 and R2 are partially overlapping (R1∩R2=R1∩2≠∅). In case the first device 100A or the second device 100B accesses the channel independently (i.e., without a colliding access by the other device), the decoding probability may be given as $P(D(Ma,1)=1|(Ma,2)^c)$ and $P(D(Ma,2)=1|(Ma,1)^c)$ where ($^c$) denotes the complementary event, i.e. $(Ma,2)^c$ denotes that device 100B is not using the channel when the first device is transmitting the signal (Ma,2). respectively assuming independence of usage, although the decoding probability is dependent on the assigned resource, R1 and R2. The probabilities of successful decoding the signals in the event of a collision are denoted as P(D(Ma,1)=1|Ma,2) and P(D(Ma,2)=1|Ma,1) respectively, where the decoding probability is dependent on the assigned resources and the overlap of the assigned resources, e.g. the amount of interference generated from device 100A to device 100B, and vice versa. From this, the network node 800 may estimate the probability of successfully decoding (Ma,1) as:

$$P(D(Ma,1)=1)=P(D(Ma,1)=1|(Ma,2)c)*P((Ma,2)c)+P(D(Ma,1)=1|Ma,2)*P(Ma,2) \quad [1]$$

From a similar formula, it is possible to derive the probabilities for an illustrative example in which there are three orthogonal resources and three users. In this example, it is assumed that if each user is given an orthogonal resource, the error probability (i.e., the probability of incorrectly decoding a received signal) will be $10^{-6}$. Then, each orthogonal resource has an SINR of about 19.6 dB. A first user is assigned radio resources 1 and 2, a second user is assigned radio resources 2 and 3 and a third user assigned radio resources 1 and 3. That is, each user is assigned two radio resources that overlap with radio resources assigned to the other two users.

In the present example, it is assumed that the independent usage probabilities are $10^{-5}$. In a worst case scenario, no interference cancellation is used, and maximal ratio combining (MRC) is used at the receiver (i.e., repetition coding). For these assumptions, a collided orthogonal resource experiences a SINR of about 0 dB for two users and about −3 dB for three users. If the error probabilities are illustrated with $Q(\frac{1}{2}\sqrt{(Eb/N_0)})$ example values of performance can be calculated using the techniques described herein.

Put Values into Q Function to Obtain Values/

Evaluating the Q-function under these assumptions, results in error probabilities 9E-12, 9E-7 and 0.3 for no, two user and three user collisions (SINR 22.6 dB, 19.6 dB, 0 dB). That is, calculating $Q(\frac{1}{2}\sqrt{(10^{(SINR/10)})})$ observe that the SINR values above are rounded of values (SINR 22.6 actually slightly less) and will give slightly different values if the Q-function is calculated for the approximate SINR values given above. Thus, the total error probability may be expressed as:

$$P(D(Ma,1)=0)=P((Ma,2)^c)^*P((Ma,3)^c)^*(P(D(Ma,1)\\=0|((Ma,2)^c \cap (Ma,3)^c))+P((Ma,2)^c)^*P((Ma,3))^*\\(P(D(Ma,1)=0|((Ma,2)^c \cap (Ma,3)))+P((Ma,2))^*\\((Ma,3)^c)^*(P(D(Ma,1)=0|((Ma,2) \cap (Ma,3)^c))+P\\((Ma,2))^*P((Ma,3))^*(P(D(Ma,1)=0|((Ma,2) \cap\\(Ma,3))) \quad [2]$$

Using the above probabilities in Equation [2] results in:

$$P(D(Ma,1)=0) \approx (1-1E-5)2^*(9E-12)+(2E-5)^*(1-1E-5)^*\\(9E-7)+(1E-10)^*0.3 \approx 6E-11 \quad [3]$$

If interference cancellation is used, the SINR values would be increased. The calculation of the Q-function would then involve the integration of the Q-function for different SINR values.

This example illustrates a use case in which it is impossible to meet a 10-9 error probability without applying the techniques described herein. If orthogonal access were used, the error probability would be 1E-6, and if contention based access were used the error probability would be about 2E-6. However, using the embodiments described herein, it is possible to obtain an error probability of 6E-11, which is even smaller than the required threshold error rate of $10^{-9}$. It will be appreciated that the error rate of decoding a message Q function for calculating error probabilities is valid for a single bit, while the error probability of transmitting an entire packet is the error probability of interest. The foregoing example illustrates the calculation of a message error rate of the special case of a packet that is one bit long. If better interference cancellation technics was used, then even better performance would be possible. For example, if a perfect SIC were deployed, then using "independent MRC decoding" for the interfering users, the error probabilities would become roughly equal to:

$$P_{IC}(D(Ma,1)=0)=P((Ma,2)_c)^*P((Ma,3)^c)^*P(D(Ma,1)\\=0|((Ma,2)^c \cap (Ma,3)^c))+P((Ma,2)^c)^*P((Ma,3))^*\\(P(D(Ma,3)=0|((Ma,1) \cap (Ma,2)^c))^*P(D(Ma,1)\\=0|((Ma,2)^c \cap (Ma,3)))+P(D(Ma,3)=1|((Ma,1) \cap\\(Ma,2)^c))^*P(D(Ma,1)=0|((Ma,2)^c \cap (Ma,3)^c)))+P\\((Ma,2))^*P((Ma,3)^c)^*(P(D(Ma,2)=0|((Ma,1) \cap\\(Ma,3)^c))^*P(D(Ma,1)=0|((Ma,2) \cap (Ma,3)^c))+P(D\\(Ma,2)=1|((Ma,1) \cap (Ma,3)^c))^*P(D(Ma,1)=0|\\((Ma,2)^c \cap (Ma,3)^c)))+P((Ma,2))^*P((Ma,3))^*(P\\(D(Ma,3)=0|((Ma1) \cap (Ma,2)))^*P(D(Ma,2)=0|\\((Ma1) \cap (Ma,3)))^* \ P(D(Ma,1)=0|((Ma,2) \cap (Ma,\\3)))+P(D(Ma,3)=1|((Ma1) \cap (Ma,2)))^*P(D(Ma,2)\\=0|((Ma1) \cap (Ma,3)))^*P(D(Ma,1)=0|((Ma,2) \cap\\(Ma,3)^c))+P(D(Ma,3)=0|((Ma1) \cap (Ma,2)))^*P(D\\(Ma,2)=1|((Ma1) \cap (Ma,3)))^*P(D(Ma,1)=0|((Ma,\\2)^c \cap (Ma,3)))+P(D(Ma,3)=1|((Ma1) \cap (Ma,2)))^*P\\(D(Ma,2)=1|((Ma1) \cap (Ma,3)))^*P(D(Ma,1)=0|\\((Ma,2)^c \cap (Ma,3)^c))) \approx (1-1E-5)2^*(9E-12)+(2E-5)\\*(1-1E-5)^*(9E-7)^*(9E-7)+(1-9E-7)^*(9E-12)+\\(1E-10)^*(0.3^{2*}0.3+2^*0.3^*0.7^*(9E-7)+0.7^{2*}(9E-\\12)) \approx 1E-11 \quad [4]$$

It is noted that contention based access would also benefit from SIC, but the resulting error probability would still be about 4E-7.

The foregoing example can be extended to more users, with an increase in complexity.

In some embodiments, the complexity may be reduced by assuming partial overlap with only one or a few users on a channel containing more than this number of users. In other embodiments, the complexity may be reduced by utilizing code division and power control such that each user access causes similar interference.

In the foregoing example, the access probabilities of each user are assumed to be independent. However, if there is a dependency in the access probabilities of users, such dependency can also be taken into account. An access probability dependency can arise, for example, from sensors measuring similar or related physical phenomenon, e.g. seismic sensors detecting earth quakes. To address this, access probability dependencies of various devices may be quantified, and overlapping resources may be assigned to devices having relatively low access probability dependencies. For example, assume a monitoring system includes multiple types of sensors that send alert messages, such as gas sensors, water sensors, vibration sensors, etc. It may be assumed that similar types of devices may have access probability dependencies. Thus, overlapping resources may not be assigned to the same types of devices, but may be assigned to different types of devices. For example, a gas sensor and a water sensor may be assigned overlapping resources, while two gas sensors may not be assigned overlapping resources.

Access probabilities can be explicitly signaled from the device, may be given by a configuration, and/or may be estimated from previous access attempts. For example, a network device may monitor accesses by devices and detect access probability dependencies from the accesses. Future assignments of radio resources may be made based on the detected access probability dependencies.

The decoding probabilities, independent or dependent on simultaneous resource use, can be estimated based on analytical expressions and/or statistical distributions given by simulations or tests.

In some embodiments, different precoder assumptions may be associated with different interference situations. For example, if a secondary resource is unused by any other user, a first precoder may be employed, and if the resource is used by a second user, a second precoder may be employed. This enables the use of different precoder strategies, e.g. MRC or null-forming, depending on whether a single user is scheduled or multiple users are scheduled.

In an implementation of the LTE standard, some embodiments could be implemented by assigning at least two users to communicate in the same subframe with some portion of the resource blocks overlapping between the two users. A receiver base station may then decode the transmissions assuming significantly worse SINR on the colliding resource blocks in its equalizer. After successful decoding of one of the signals, interference cancelation can be applied. Transmissions requiring a specific error probability can be assigned based on the probability of successful decoding using only the non-overlapping component parts and the probability of successfully decoding using the non-overlapping component parts and also the overlapping (colliding) component parts, and the probability to be able to cancel the interference, or the probability of not having interference, on the colliding part.

The current LTE standard does not explicitly include contention or "access probability" even if it can be realized in the scheduling using discontinuous reception (DRX), in which many users may be scheduled, but only users with data will receive the scheduling message.

In an example embodiment, multiple WiFi carriers may be used. A specific device may be configured to transmit a message over a number of configured carriers. In some embodiments, overlapping carrier-sets can be allocated to different users.

If the radio protocol used on each carrier is compliant to the WiFi standard, then carrier sense may be used. Also, in a WiFi system, different users are not necessarily time synchronized as they are in LTE. This implies that typically each carrier will be occupied by only one user (i.e. the one that first got access to the medium). Hence the SINR will then be 0 on the carriers that was already occupied by another user.

In this embodiment it is also possible that some of the multiple carriers are actually occupied by some other service that does not need to be aware of the critical service that is using a partially overlapping resource assignment. Hence the proposed solution can also mitigate the problem that the WiFi carrier can be interfered by other services. Due to the fact that the normal WiFi spectrum is free to use for anyone, it is not always possible to fully avoid interfering services if the unlicensed spectrum is used for a critical service.

As described above some embodiments provide systems/methods for assigning assignable resources to multiple users. The methods may be employed in a network node, such as a radio base station, that is responsible for assigning radio resources to devices.

According to some embodiments, the network node may allocate assignable resources to a first device that are sufficient to obtain a first error rate. The network node may allocate assignable resources to a second device that at least partially overlap the network resources assigned to the first device, where the amount of overlap is determined based on the access probabilities of the first and second devices, and the decoding probabilities in the event of simultaneous access by the first and the second devices.

In some embodiments, the assignable resources may be determined based on one or more of a maximum number of users, the availability of physical resources, a decoding performance, a radio characteristic, an access probability and an error performance target.

Furthermore, the amount of overlap and/or the decoding probability may also be determined based upon an interference cancelation method that is employed to reduce interference between the first device and the second device.

In still further embodiments, the systems/methods may employ an iterative process to discover an optimal or near optimal amount of overlap of assignable resources. For example, the systems/methods may allocate assignable resources to a first device that are sufficient to obtain a first error rate and/or a first level of SINR in the absence of interference. The network node may allocate assignable resources to a second device that at least partially overlap the network resources assigned to the first device by a predetermined amount. The systems/methods may determine an actual error rate and/or an actual SINR experienced when colliding messages are received from the first and second devices, and may adjust the overlap of the network resources in response to the actual error rate. For example, if the actual error rate and/or an actual SINR exceed a first predetermined threshold level, the amount of overlap of the network resources assigned to the first and second devices may be reduced. Conversely, if the actual error rate and/or an actual SINR is below a second predetermined threshold level, the amount of overlap of the network resources assigned to the first and second devices may be increased. The first and second predetermined threshold levels may be the same or different levels. Furthermore, the amount of overlap of the network resources may be increased or decreased based on one or both of the SINR and/or error rate measurements.

In some embodiments, after allocating the resources to the first and second devices, the systems/methods may instruct the first and second devices to transmit colliding probing packets whose contents are known a priori to the receiver. The receiver can then demodulate the received packets and determine levels of SINR and/or error rates for the transmissions. Interference cancellation may be effectively used at the receiver on the probing packets, since both the timing and content of the probing packets is known a priori to the receiver.

In some embodiments, error rates may be determined from offline estimates based on channel knowledge of the devices or based on simulations.

Operations of systems/methods according to some embodiments are illustrated in the flowcharts of FIGS. 3 to 8.

Figure 3:
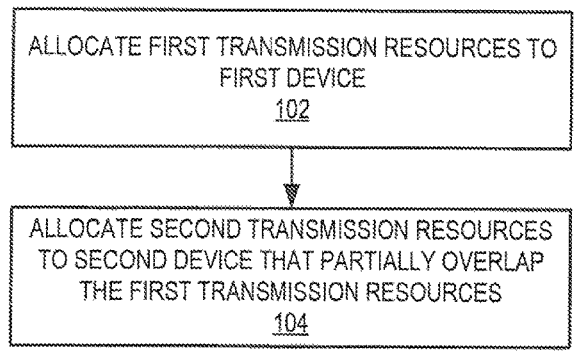
FIGS. 3 to 10 are flowcharts that illustrate operations of a network node that transmits synchronization signals according to various embodiments of the invention.

Referring to FIG. 3, a method of assigning transmission resources by an access node may include allocating first transmission resources to a first device (block 102), and allocating second transmission resources to a second device, wherein the second transmission resources partially, but not completely, overlap the first transmission resources. That is, a portion of the second transmission resources may overlap a portion of the first transmission resources.

In some embodiments, an amount of overlap between the first transmission resources and the second transmission resources may be based on a target error rate for decoding transmissions received from the first device and the second device.

In some embodiments, an amount of overlap between the first transmission resources and the second transmission resources may be based on access probabilities of the first device and the second device.

In some embodiments, an amount of overlap between the first transmission resources and the second transmission resources is based on a probability of successfully decoding transmissions by the first and second devices that utilize an overlapping portion of the first and second transmission resources.

Figure 4:
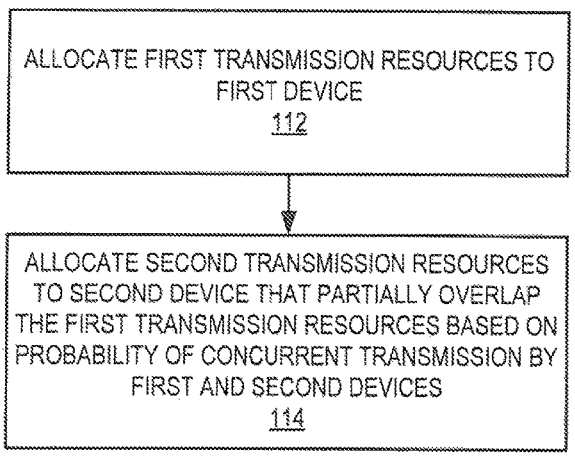
Figure 5:
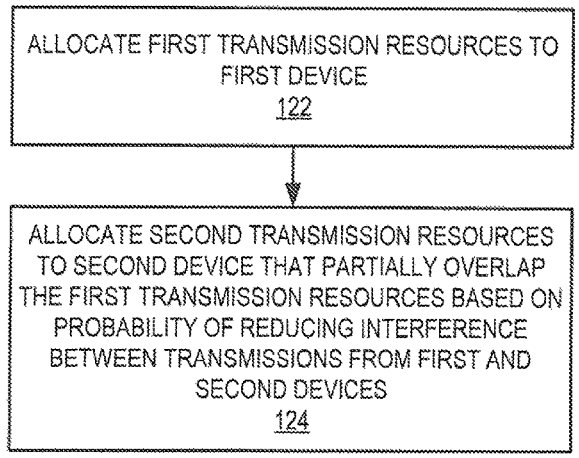

Referring to FIG. 4, a method of assigning transmission resources by an access node may include allocating first transmission resources to a first device (block 112), and allocating second transmission resources to a second device, wherein the second transmission resources partially, but not completely, overlap the first transmission resources, based on a probability of concurrent transmission by the first and second devices (block 114).

In some embodiments, the first and second transmission resources may be determined in response to a maximum number of users, an amount of available physical resources, a decoding performance, a radio characteristic, an access probability and/or an error performance target.

In some embodiments, the first and second transmission resources may include frequency bands that overlap in frequency, time slots that overlap in time, quasi-orthogonal spreading codes, and/or overlapping antenna beams.

Figure 6:
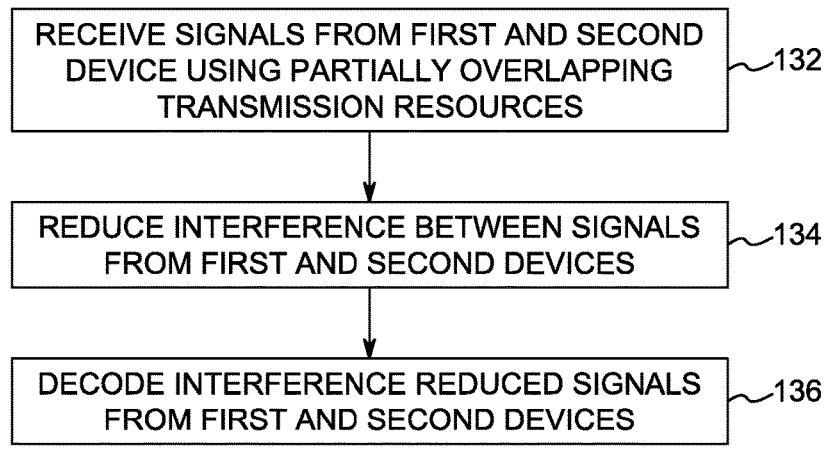

Referring to FIG. 6, methods according to some embodiments include receiving first and second signals from the first and second devices that were transmitted using the overlapping first and second transmission resources (block 132), reducing interference in the first and second signals (block 134) and decoding the first and second signals (block 136).

Figure 7:
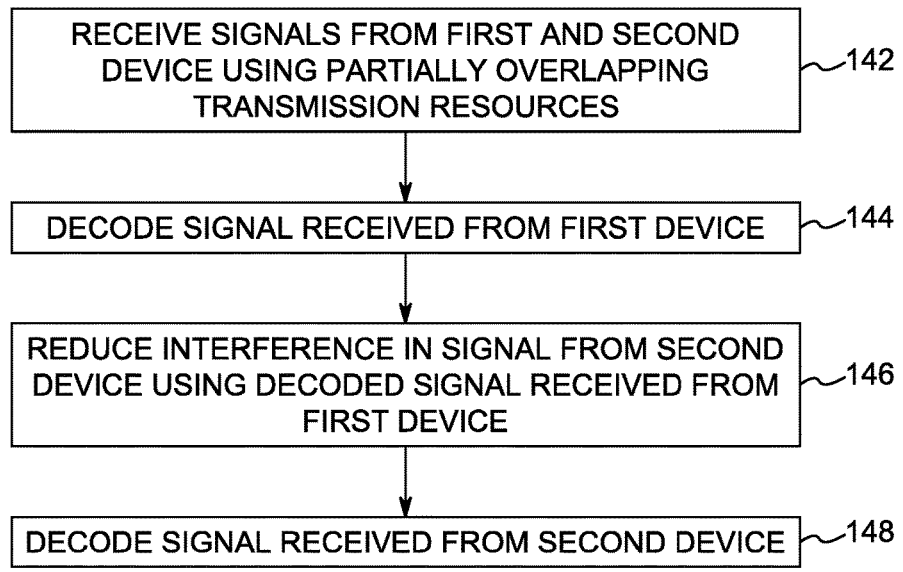

Referring to FIG. 7, some embodiments include receiving first and signals from first and second devices that were transmitted using the overlapping first and second transmission resources (block 142), decoding the first signal (block 144), reducing interference in the second signal based on the decoded first signal (block 146), and decoding the second signal after reducing interference in the second signal (block 148).

In some embodiments, the first signal may be decoded using multiple hypotheses associated with respective different probabilities of transmission and/or decoding success.

Figure 8:
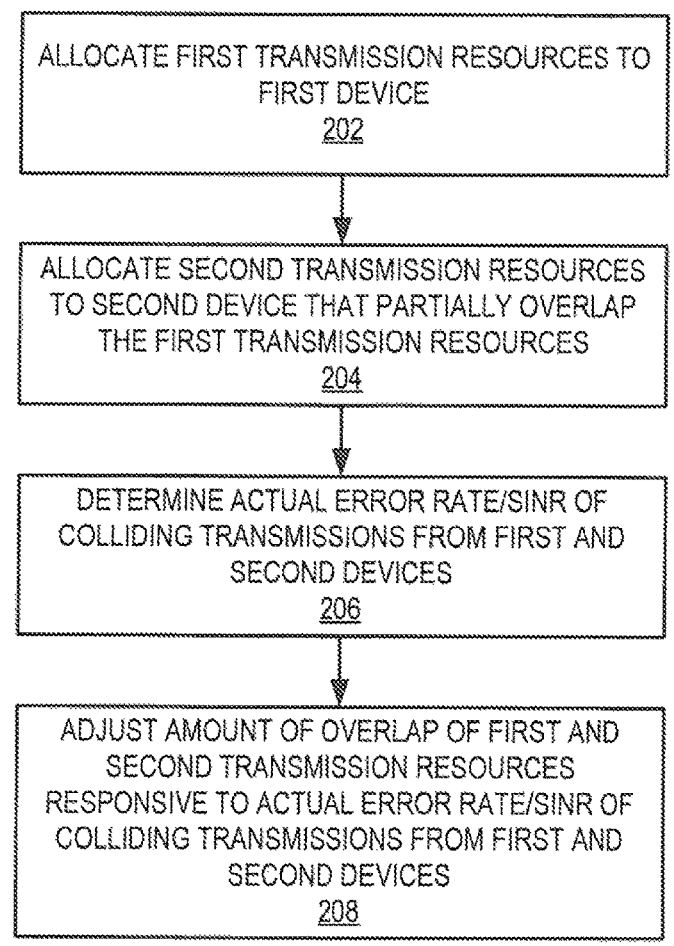

Referring to FIG. 8, systems/methods according to some embodiments allocate first transmission resources to a first device (block 202), and allocate second transmission resources to a second device, wherein the first and second transmission resources at least partially overlap (block 204). The systems/methods determine an actual error rate and/or SINR of colliding transmissions from the first and second devices (block 206), and adjust an amount of overlap of the first and second transmission resources in response to the actual error rate and/or SINR of colliding transmissions (block 208).

Figure 9:
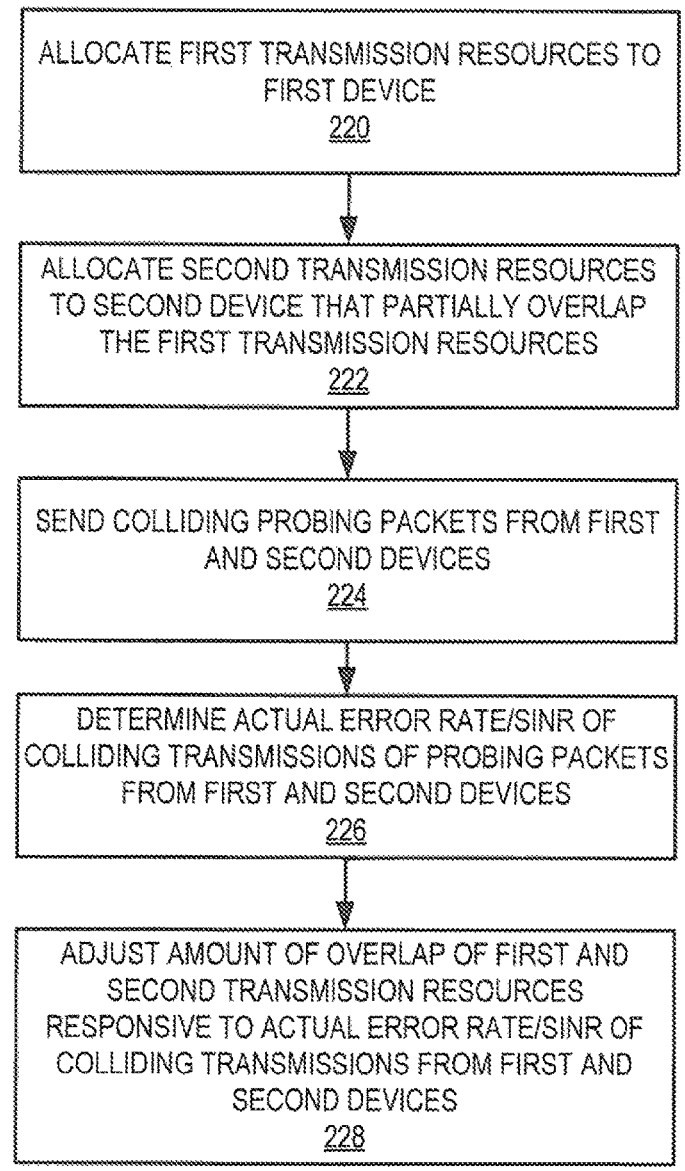

Referring to FIG. 9, systems/methods according to some embodiments allocate first transmission resources to a first device (block 220), and allocate second transmission resources to a second device, wherein the first and second transmission resources at least partially overlap (block 222).

The systems/methods then instruct the first and second devices to send colliding packets (block 224). The packets may be probing packets whose content and/or timing is known a priori to the receiver.

The systems/methods determine an actual error rate and/or SINR of colliding transmissions from the first and second devices (block 226), and adjust an amount of overlap of the first and second transmission resources in response to the actual error rate and/or SINR of colliding transmissions (block 228).

Figure 10A:
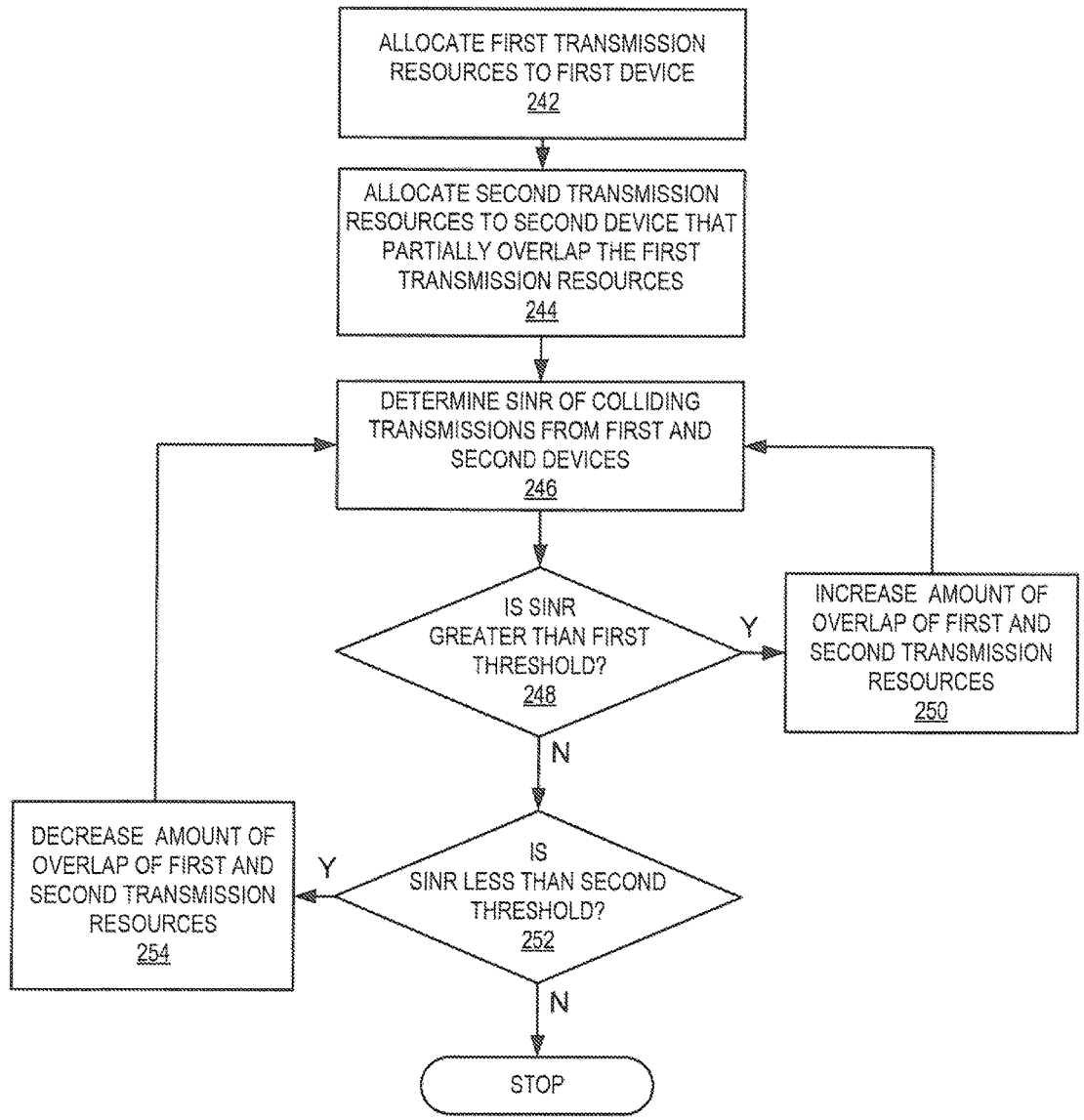

Referring to FIG. 10A, systems/methods according to some embodiments allocate first transmission resources to a first device (block 242), and allocate second transmission resources to a second device, wherein the first and second transmission resources at least partially overlap (block 244). The systems/methods determine a SINR of colliding transmissions from the first and second devices (block 246). The systems/methods then compare the determined SINR to a first threshold (block 248). If the SINR is greater than a first threshold, the systems/methods may increase an amount of overlap of the first and second transmission resources (block 250), and operations may return to block 246.

If the SINR is not greater than the first threshold, the systems/methods may compare the determined SINR to a second threshold (block 252). If the SINR is less than the second threshold, the systems/methods may decrease an amount of overlap of the first and second transmission resources (block 254), and operations may return to block 246. Otherwise, the operations may terminate. It will be appreciated that the first threshold may be greater than the second threshold. Thus, in general, if the SINR is between the first threshold and the second threshold, the systems/methods may not adjust the amount of overlap of the first and second transmission resources.

Figure 10B:
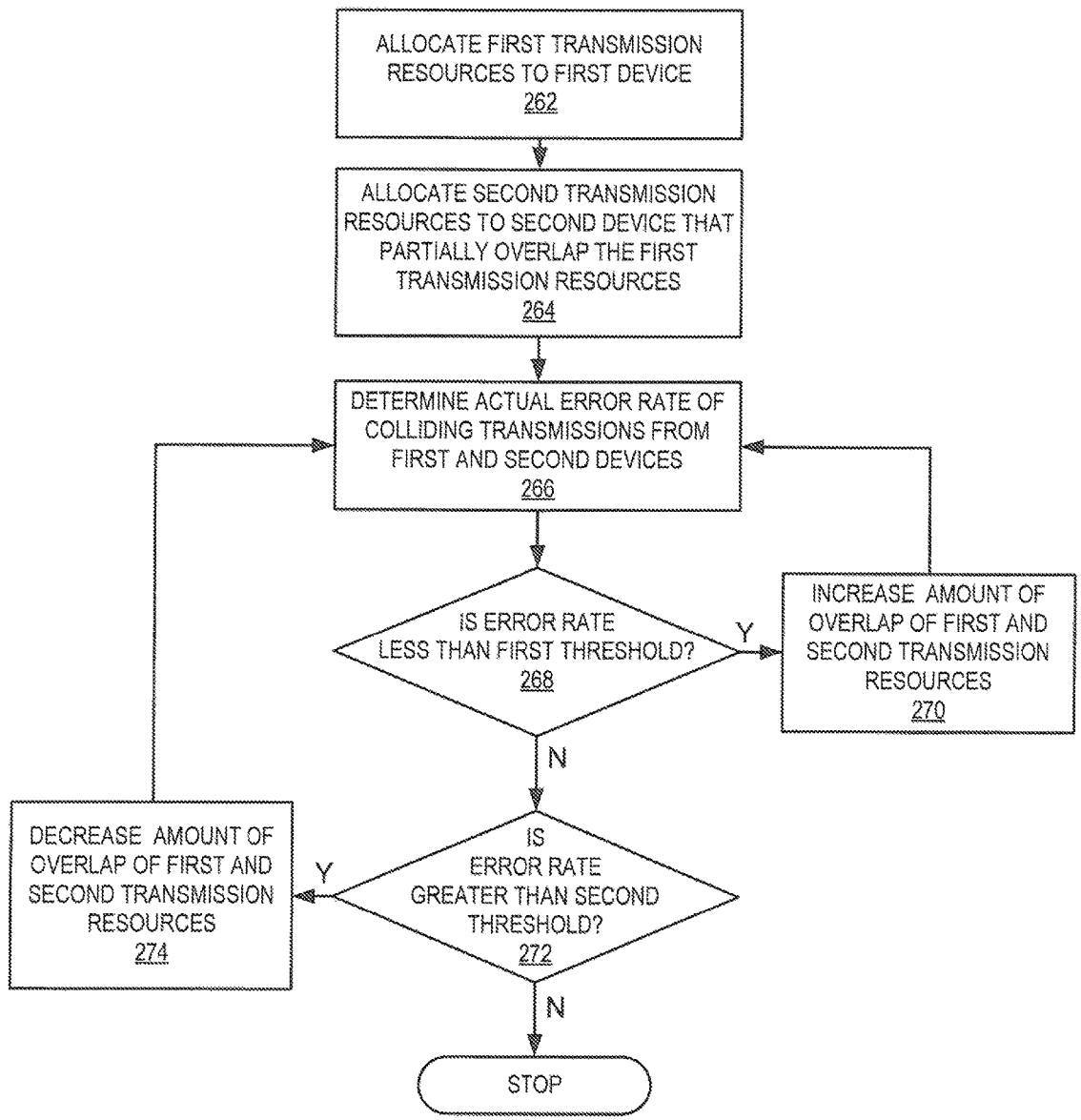

Referring to FIG. 10B, systems/methods according to some embodiments allocate first transmission resources to a first device (block 262), and allocate second transmission resources to a second device, wherein the first and second transmission resources at least partially overlap (block 264). The systems/methods determine an actual error rate of colliding transmissions from the first and second devices (block 266). The systems/methods then compare the actual error rate to a first threshold (block 268). If the actual error rate is less than the first threshold, the systems/methods may increase an amount of overlap of the first and second transmission resources (block 270), and operations may return to block 266.

If the actual error rate is not less than the first threshold, the systems/methods may compare the actual error rate to a second threshold (block 272). If the actual error rate is greater than the second threshold, the systems/methods may decrease an amount of overlap of the first and second transmission resources (block 274), and operations may return to block 266. Otherwise, the operations may terminate. It will be appreciated that the first threshold may be less than the second threshold. Thus, in general, if the actual error rate is between the first threshold and the second threshold, the systems/methods may not adjust the amount of overlap of the first and second transmission resources.

Figure 11:
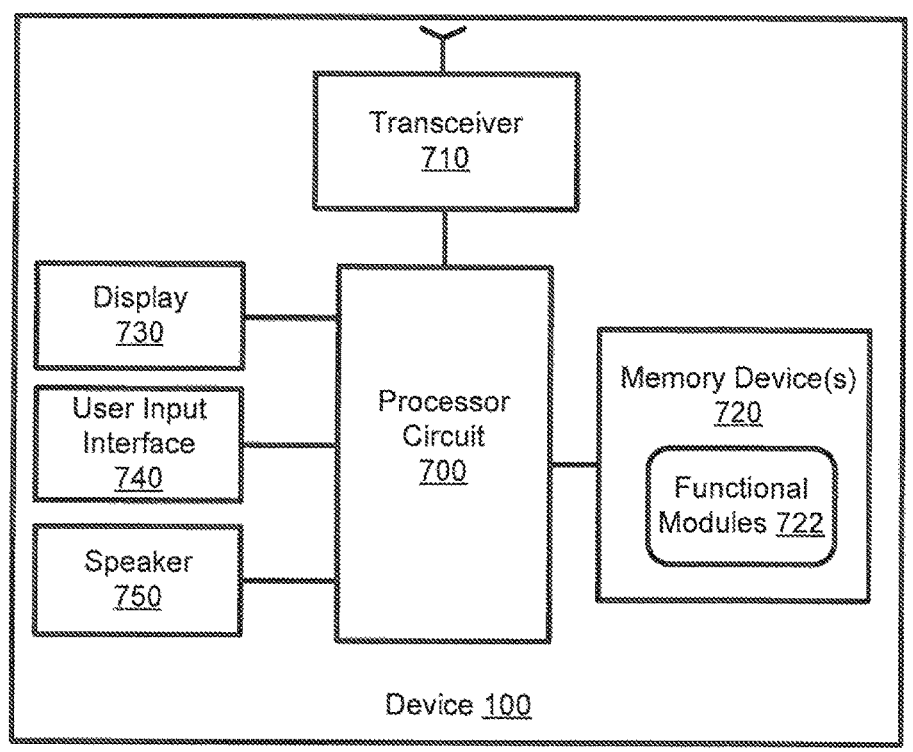
FIG. 11 is a block diagram of a user equipment unit according to some embodiments.

FIG. 11 is a block diagram of a device 100 that is configured to perform operations according to one or more embodiments disclosed herein. The device 100 includes a transceiver(s) 710, a processor circuit(s) 700 (referred to as processor for brevity), and a memory device(s) 720 (referred to as memory for brevity) containing functional modules 722. The device 100 may further include a display 730, a user input interface 740, and a speaker 750.

The transceiver 710 is configured to communicate with a network node through a wireless air interface using one or more of the radio access technologies disclosed herein. The processor 700 may include one or more data processing circuits, such as a general purpose and/or special purpose processor, e.g., microprocessor and/or digital signal processor. The processor 700 is configured to execute computer program instructions from the functional modules 722 of the memory 720 to perform at least some of the operations described herein as being performed by a communication device to which radio resources are assigned.

Figure 12A:
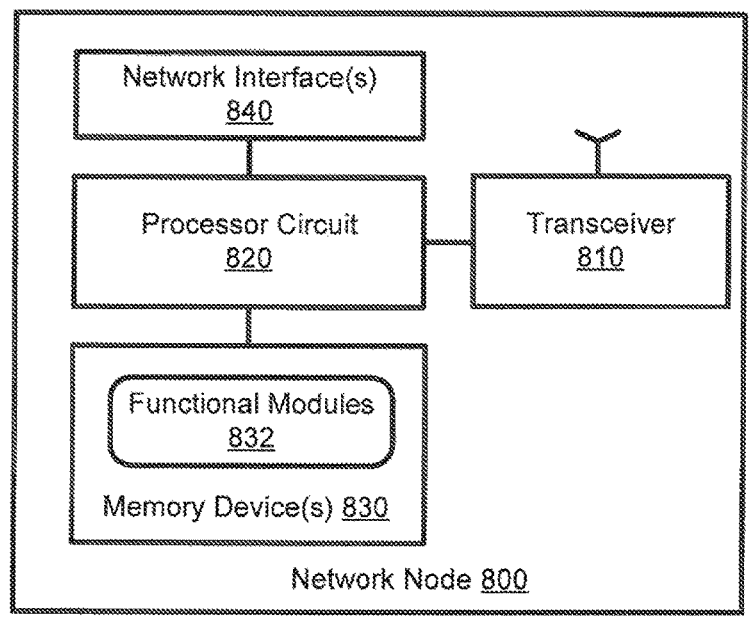
FIG. 12A is a block diagram of a network node according to some embodiments.

FIG. 12A is a block diagram of a network node 800 that is configured according to one or more embodiments disclosed herein for a radio network node, an access node, or other network node. The network node 800 can include a transceiver 810, a network interface(s) 840, a processor circuit(s) 820 (referred to as processor for brevity), and a memory device(s) 830 (referred to as memory for brevity) containing functional modules 832.

The transceiver 810 is configured to communicate with the UE 100 using one or more of the radio access technologies disclosed herein, when the network node 800 is a radio network node. The processor 820 may include one or more data processing circuits, such as a general purpose and/or special purpose processor, e.g., microprocessor and/or digital signal processor, that may be collocated or distributed across one or more networks. The processor 820 is configured to execute computer program instructions from the functional modules 832 of the memory device(s) 830 to perform at least some of the operations and methods of described herein as being performed by a network node. The network interface 840 communicates with other network nodes and/or a core network.

Figure 12B:
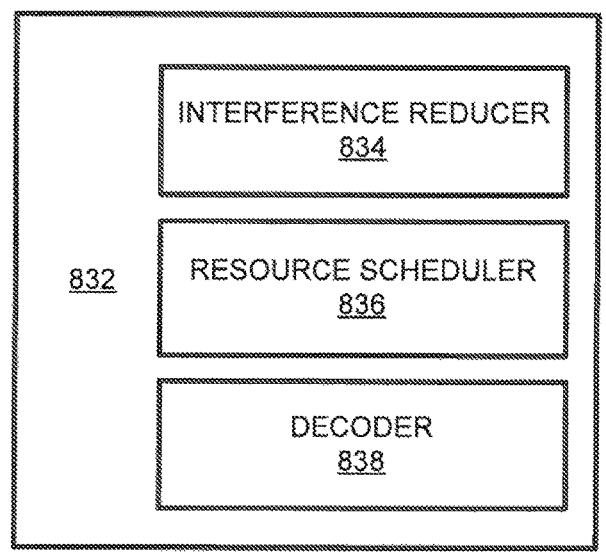
FIG. 12B is a block diagram that illustrates functional modules of a network node according to some embodiments.

FIG. 12B is a block diagram that illustrates the functional modules 832 of the memory 830 in more detail. As shown therein, the functional modules 832 may include an interference reducer 834, a resource scheduler 836 and a decoder 838. Although illustrated in FIG. 10 as residing within the same network node, it will be appreciated that the interference reducer 834, resource scheduler 836, and decoder 838 can be implemented in separate network nodes. The interference reducer 834 is configured to reduce interference in one or more received signals that were transmitted using overlapping radio resources. In particular, the interference reducer 834 may perform successive interference reduction on the received signals. However, other interference reduction techniques can be used.

The resource scheduler 836 may determine which resources to allocate to network devices based on the criteria described above, such as the probability of decoding received signals, the access probabilities, etc.

ABBREVIATIONS

MTC Machine type communications
TDD Time division duplexing
FDD Frequency division duplexing
TDM Time division multiplexing
FDM Frequency division multiplexing
CDM Code division multiplexing
OFDM Orthogonal frequency division multiplexing
LTE Long-Term Evolution (3GPP standard)
UMTS Universal mobile telecommunications system
MRC Maximal ratio combining
SINR Signal to interference plus noise ratio It will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of assigning transmission resources by an access node, the method comprising:
    allocating first transmission resources to a first device;
    allocating second transmission resources to a second device, wherein the second transmission resources partially, but not completely, overlap the first transmission resources, and wherein an amount of overlap between the first transmission resources and the second transmission resources is based on a target error rate for decoding transmissions received from the first device and the second device and/or a signal to interference plus noise ratio (SINR) of transmissions from the first device and the second device;
    calculating an actual error rate for decoding the transmissions received from the first device and/or the second device; and
    adjusting the amount of overlap between the first transmission resources and the second transmission resources in response to the actual error rate.

2. The method of claim 1, wherein the amount of overlap between the first transmission resources and the second transmission resources is based on access probabilities of the first device and the second device.

3. The method of claim 1, wherein the amount of overlap, between the first transmission resources and the second transmission resources, is based on a probability of successfully decoding transmissions by the first device and the second device that utilize an overlapping portion of the first transmission resources and the second transmission resources.

4. The method of claim 1, wherein the first transmission resources and the second transmission resources are determined in response to a maximum number of users, an amount of available physical resources, a decoding performance, a radio characteristic, an access probability, and/or an error performance target.

5. The method of claim 1, wherein the first transmission resources and the second transmission resources comprise frequency bands that overlap in frequency.

6. The method of claim 1, wherein the first transmission resources and the second transmission resources comprise time slots that overlap in time.

7. The method of claim 1, wherein the first transmission resources and the second transmission resources comprise non-orthogonal spreading codes.

8. The method of claim 1, wherein the first transmission resources and the second transmission resources comprise overlapping antenna beams.

9. The method of claim 1, further comprising:
receiving first and second signals from the first device and the second device, wherein the first and second signals were transmitted using the overlapping first transmission resources and the overlapping second transmission resources;
reducing interference in the first and second signals; and
decoding the first and second signals.

10. The method of claim 1, further comprising:
receiving first and second signals from the first device and the second device, wherein the first and second signals were transmitted using the overlapping first transmission resources and the overlapping second transmission resources;
decoding the first signal;
reducing interference in the second signal based on the decoded first signal; and
decoding the second signal after reducing the interference in the second signal.

11. The method of claim 10, wherein decoding the first signal comprises decoding the first signal using multiple hypotheses associated with respective different probabilities of transmission and/or decoding success.

12. The method of claim 1, further comprising detecting a collision between first and second signals from the first device and the second device.

13. An access node interacting with first and second user equipment nodes, the access node comprising:
a processing circuit configured to:
allocate first transmission resources to a first device and second transmission resources to a second device, such that the second transmission resources partially, but not completely, overlap the first transmission resources, and such that an amount of overlap between the first transmission resources and the second transmission resources is based on a target error rate for decoding transmissions received from the first device and the second device and/or a signal to interference plus noise ratio (SINR) of transmissions from the first device and the second device,
calculate an actual error rate for decoding the transmissions received from the first device and/or the second device, and
adjust the amount of overlap between the first transmission resources and the second transmission resources in response to the actual error rate; and
a transceiver configured to receive first and second signals, from the first device and the second device, that are transmitted using the overlapping first transmission resources and the overlapping second transmission resources.

14. The access node of claim 13, wherein the processing circuit is further configured to reduce interference in the first and second signals and decode the first and second signals.

15. The access node of claim 13, wherein the processing circuit is further configured to:
decode the first signal;
reduce interference in the second signal based on the decoded first signal; and
decode the second signal after reducing the interference in the second signal.

16. A method of assigning transmission resources by an access node, the method comprising:
allocating first transmission resources to a first device;
allocating second transmission resources to a second device, wherein a portion of the second transmission resources overlap a portion of the first transmission resources, wherein an amount of overlap between the first transmission resources and the second transmission resources is based on a target error rate for decoding transmissions received from the first device and the second device and/or a signal to interference plus noise ratio (SINR) of transmissions from the first device and the second device;
calculating an actual error rate for decoding the transmissions received from the first device and/or the second device; and
adjusting the amount of overlap between the first transmission resources and the second transmission resources in response to the actual error rate.

* * * * *